United States Patent Office 3,344,091
Patented Sept. 26, 1967

3,344,091
PROCESS FOR CONVERTING SCRAP POLYESTER INTO ACTIVE PREPOLYMER PARTICLES FOLLOWED BY POWDER BUILD-UP TO HIGH MOLECULAR WEIGHTS
Nicholas C. Russin and Charles J. Kibler, Kingsport, Tenn., and Kenneth T. Barkey, Rochester, N.Y., assignors to Eastman Kodak Company, Rochester, N.Y., a corporation of New Jersey
No Drawing. Filed May 19, 1965, Ser. No. 457,216
10 Claims. (Cl. 260—2.3)

ABSTRACT OF THE DISCLOSURE

A process for converting scrap polyester into active prepolymer particles followed by powder build-up to high molecular weights, said process comprising mixing (a) scrap polyester of a glycol and an aromatic dicarboxylic acid and (b) an amount of said glycol; heating said mixture to form a prepolymer; comminuting said prepolymer into solid particles; and heating said particles with agitation in an inert atmosphere until a built-up polyester is obtained.

---

This application is a continuation-in-part of application Serial No. 731,141 filed April 28, 1958, now abandoned.

This invention relates to practical problems associated with large scale manufacturing of linear condensation polyesters such as polyethylene terephthalate using the solid-phase or powder build-up method. One problem is the economic recovery of scrap high polyester. A further problem is the reactivation of so-called "inactive" prepolymer scrap which fails to polymerize satisfactorily during the powder build-up step. This invention provides for the reuse of such otherwise useless polyester scrap.

The methods for producing polyethylene terephthalate and other linear condensation polyesters can generally be grouped into two categories. The most common method generally believed to be the most advantageous from the overall point of view involves maintaining the reactants in a liquid condition during the entire build-up to the final polymer. The other category can be referred to as the solid-phase process or the powder buildup process. Under the powder buildup method, the initial polyesterification is conducted to an intermediate point whereupon the cooled prepolymer is ground to small particles. The powder thus obtained is then heated in an inert atmosphere at either atmospheric pressure or under a vacuum at a temperature less than that which would cause the particles to stick together until such time as the intrinsic viscosity reaches the desired value. When atmospheric pressure is used, the inert atmosphere is advantageously caused to circulate through or over the powder so as to carry off volatile byproducts.

Although those skilled in the art generally seem to suppose that a continuous melt phase polymerization process is the commercially most effective process for preparing linear condensation polyesters, certain invaluable advantages accrue to the use of a batch operated commercial process for making such polyesters, provided that a powder build-up step is used for the final polymerization of an intermediate prepolymer which can be defined as an intermediately polymerized polyester having a molecular weight on the order of about 2500 to about 12,000 (intrinsic viscosity of about 0.2–0.45 for polyethylene terephthalate) so as to form a polyester having a molecular weight of at least about 14,000 or higher (intrinsic viscosity of about 0.5–1.5 or higher for polyethylene terephthalate).

Broadly stated, this invention covers processes for the reuse of commercially useless scrap polyesters (prepolymers and high polyesters) which are condensation polymers of glycols and aromatic dicarboxylic acids, such as prepolymers and high polymers of ethylene glycol and terephthalic acid. The first step in such processes broadly comprises mixing the otherwise useless polyester with the glycol originally used in preparing the useless polyester, with or without the additional presence of a lower dialkyl ester of the aromatic dicarboxylic acid whose dehydroxylated residues are present (as a result of polyesterification) in the useless polyester.

The first step in these processes as covered by this invention is predicated upon the second step being performed since the desired reuse of useless polyester depends upon the second step following the defined first step. The second step is limited to the solid-phase polymerization method for polymerizing the active prepolymer formed by Step 1.

This second step of the invention broadly comprises heating particles of the prepolymer formed by Step 1 with agitation in an inert atmosphere at from about 10° to about 90° C. below the melting point of the prepolymer and at a temperature at which the particles will remain substantially free flowing, i.e. capable of agitation without conglomeration. Such temperatures are preferably 20°–70° C. below the crystalline melting point of the prepolymer. The crystalline melting point is in the range of about 255°–264° C. for ordinary prepolymers of polyethylene terephthalate, depending upon how the prepolymer is prepared which determines its purity as a true homopolymer. The length of heating depends upon the temperature and the desired ultimate molecular weight which is a different function of the intrinsic viscosity for each polyester.

By using polyethylene terephthalate high polyester scrap it is possible to not only satisfactorily accomplish the recovery or reuse of what otherwise would be economically useless scrap polyester, but to also increase the rate of polymerization so as to shorten the length of time needed during the powder buildup step to produce whatever ultimate intrinsic viscosity may be desired. The same attribute can also be used to produce a final polyester under conditions which are much the same as though no reused scrap polyester were employed in the preparation of the monomeric composition and subsequent prepolymer so as to result in a final polymer having an intrinsic viscosity at least 5% greater than would have been obtained if no scrap polyester had been reused in preparing the monomeric composition.

This invention can be compared with known melt-phase processes for reusing polyester as follows:

| Solid phase Process of this Invention | Melt Phase Process of Prior Art |
|---|---|
| High temperature and vacuum used principally in prepolymerization step of obtaining low molecular weight prepolymer. | High temperatures and vacuum used for extensive periods of time both in prepolymerization and polymerization steps to obtain final high molecular weight polymer. |
| Grinding operation used. | No grinding operation. |
| Temperatures below melting point of polymer used during final polymerization step. | Temperatures above melting point of polymer used during final polymerization step. |
| Product a finely powdered solid. | Product in massive melt form. |
| Use of scrap polymer or inactive substandard prepolymer results in a higher I.V. polyester. | Use of scrap polymer or inactive prepolymer detrimental both to process and properties of polymer. |
| Polymer substantially colorless. | Colored polymer due to colored bodies formed by high temperature side reactions. |
| Polymer of comparatively high inherent viscosity. | Polymer of comparatively low inherent viscosity due to higher operating temperature causing side reactions which generate chain-terminating compounds. |
| Lesser amount of diethylene glycol byproduct in polyethylene terephthalate production. | Greater amount of diethylene glycol byproduct in polyethylene terephthalate production. |

| Solid phase Process of this Invention | Melt Phase Process of Prior Art |
|---|---|
| Polymer of higher melting point. | Polymer of comparatively low (sometimes undesirably low) melting point. |
| Easier handling of equipment and control of process due to desirably comparatively low temperatures. | Special handling required due to high temperatures and hot liquids of high melt viscosities. |
| Easy blending of additives with finely powdered polymer. | problem of dispersing additives in molten polymer. |

In this specification the term high polyester refers to polymers which have molecular weights in excess of about 14,000 and may have molecular weights in excess of 50,000 up to 150,000 or more. The term prepolymer refers to polyesters having molecular weights of from about 2,500 to about 12,000.

A series of tests using varying amounts of from none to 50% of (1) reused scrap polyester and (2) reused inactive prepolymer scrap by means of a melt phase process as described in the prior art give the following results:

*Preparation of polyethylene terephthalate by the melt-phase process in the presence of reused polymer*

[Polymerization conditions—1½ hrs. at 275° C. and 0.20 mm. of mercury pressure]

| Wt. percent substandard prepolymer: | Final polymer viscosity |
|---|---|
| 0 | 0.63 |
| 25 | 0.60 |
| 50 | 0.39 |

| Wt. percent scrap film: | |
|---|---|
| 0 | 0.55 |
| 10 | 0.37 |
| 25 | 0.49 |
| 50 | 0.34 |

It is evident from this data that the presence of substandard prepolymer or scrap film during the melt phase preparation of poly(ethylene terephthalate) inhibits the polymerization.

As can readily be seen by the data in the above table using either scrap high polyester or inactive prepolymer scrap in the solid-phase process of this invention results in a surprisingly high intrinsic viscosity in a comparatively short polymerization time, whereas use of either high polymer scrap or inactive prepolymer scrap in the melt-phase process can be actually detrimental to the polymer build-up and the raising of the intrinsic viscosity.

This specification is roughly subdivided into two overlapping but somewhat independent categories within the above stated generic characteristics of the invention. These categories are called high polyester scrap recovery and inactive prepolymer recovery. In both cases the reused polyester scrap is involved in a powder type, i.e. solid-phase, final build-up of the molecular weight.

Many disclosures in the prior art discuss various methods which may be useful in recovering scrap polyethylene terephthalate. Such disclosures generally relate to high polyesters made by the melt phase polymerization technique.

Scrap polyester film, fiber and other shapes can be chopped up and substituted for the dimethyl terephthalate being used in the usual melt-phase technique for preparing polyethylene terephthalate. Thus 60 lbs. of scrap polyethylene terephthalate, 60 lbs. of dimethyl terephthalate and 80 lbs. of ethylene glycol can be reacted with or without additional catalyst (other than that residual original catalyst which may be in the scrap) using processes analogous to that described in the patented art such as U.S. 2,465,319. The resulting polyester using the scrap has properties essentially the same as would have been produced using 120 lbs. of dimethyl terephthalate. A similar result is also suggested as a less desirable possibility in practicing the process disclosed in U.S. 2,727,882 and U.S. 2,933,476 where it is said that scrap may be dissolved in a liquid monomeric composition composed essentially of bis-2-hydroxyethyl terephthalate and very low molecular weight polymers thereof having a degree of polymerization of less than 4 on the average; however, there is no suggestion that the scrap might be used in preparing the monomeric composition and subsequently used to advantage in preparing prepolymers having unexpected properties when polymerized by the powder buildup process.

Methods for recovering useful components from polyethylene terephthalate are shown in patents such as British 610,135; 610,136; 801,813; 802,718 and 755,071; Canadian 532,179 and 597,741; German 960,008; 1,001,820; 1,003,714, and 1,167,530; Belgian 545,458; 551,307, and 553,308, and French 1,164,112.

In view of the state of the art it was most unexpected to find that high polyester scrap could be recovered under certain circumstances with not only a good clear colorless new high polyester being obtained but also the process being used was unobviously enhanced. This was especially unexpected since it applies to the solid-phase polymerization process which has been faced with an especially difficult practical problem caused by unpredictably recurring "inactive" batches of prepolymer. Hence, it would be supposed that there were already enough problems involved in the solid-phase process without adding high polyester scrap during the preparation of the monomeric bis(hydroxyethyl)terephthalate, bis(4-hydroxymethylcyclohexylmethyl)terephthalate, or the like.

According to one embodiment of this invention, it has been found that useless polyester may not only be reused by addition during the preparation of such monomeric compositions but that by so doing, the prepolymer formed from such a monomeric composition has an enhanced capacity to polymerize under solid-phase conditions, i.e. the powdered prepolymer has a higher activity such that it can be formed into a polyester of higher intrinsic viscosity in a given time, or in some cases in any length of time, or it can be polymerized to a given intrinsic viscosity in a shorter time.

It is an object of this invention to provide a new technique for reusing commercially useless linear, condensation-type, high polyester scrap and similarly useless scrap prepolymers.

It is another object to provide a method of solid-phase polyesterification whereby prepolymers of enhanced activity can be produced.

It is a further object to provide prepolymers of linear condensation polyesters which will polymerize by the solid-phase technique in powder form more rapidly than those prepolymers obtained by ordinary methods.

Other objects will become apparent elsewhere herein.

These objects can be achieved as regards various linear condensation polyesters of which one of the best known examples is polyethylene terephthalate.

Highly polymeric polyethylene terephthalate (I.V. of at least 0.55) can be produced according to a commercially feasible powder buildup process by performing the following steps (1) heating under an inert atmosphere at substantially atmospheric pressure at above 110° C. 1 mole proportion of a lower alkyl (1–6 carbon atoms) ester of terephthalic acid and more than 1 mole proportion of ethylene glycol in the presence of an ester interchange catalyst to produce a monomeric composition consisting substantially of a mixture of bis(hydroxyethyl)terephthalate with minor quantities of dimers and other low polymers thereof, said monomeric composition having a melting point of less than about 225° C. and an intrinsic viscosity of less than 0.1 and having a maximum degree of polymerization of less than 6 on the average, said heating being conducted under conditions removing substantially 2 mole proportions of methanol; (2) heating said monomeric composition under a reduced pressure and under conditions removing substantially all ethylene glycol in excess of one mole of that originally introduced whereby said monomeric composition is converted into a prepolymer having a melting point above 250° C. and an intrinsic viscosity of from about 0.2 to about 0.45; (3) cooling and comminuting said prepolymer to form particles substantially passing through a 20 mesh screen (preferably 100% passes through 20 mesh screen having 0.841 mm. openings and 95% is retained upon a 200 mesh screen having 0.074 mm. openings), and (4) heating said comminuted prepolymer particles with agitation in an inert atmosphere at a temperature of from about 200° C. to about 230° C. at a pressure of from one micron of mercury pressure up to atmospheric pressure and when said heating is not being performed under a pressure of less than about 500 microns of Hg pressure, then said inert atmosphere is moved through the region in which said prepolymer particles are being heated. The sieve sizes as mentioned are those set forth by ASTM specifications.

As mentioned above, this powder buildup process for the polymerization of highly polymeric polyethylene terephthalate has not been generally considered to be as advantageous for the preparation of such polyesters because of the number of steps set forth in the above described process which make it more complicated than melt phase polymerization which does not require the steps of separating an intermediate polymer referred to above as a prepolymer, grinding the prepolymer to a powder and then reheating the powdered prepolymer to continue the polymerization. Although the powder buildup method of polyesterification processes might appear to be of secondary value for this and other reasons, this invention provides an unexpected attribute which can be associated with the powder buildup process so as to make it commercially quite advantageous.

According to a specific embodiment of this invention there is provided a process for preparing linear polyethylene terephthalate having an intrinsic viscosity of at least 0.55 (a high polyester) comprising: (1) Reacting (a) 60–110 parts by weight of dimethyl terephthalate, (b) 10–60 parts by weight of scrap polyethylene terephthalate having an intrinsic viscosity of at least 0.55, the total of the parts of said dimethyl terephthalate and said scrap being 120 parts, and (c) 80 parts by weight of ethylene glycol in the presence of a polyesterification catalyst at a temperature of from about 150° C. to about 260° C. with agitation under conditions whereby methanol is removed thereby forming a monomeric composition consisting substantially of bis(hydroxyethyl) terephthalate and low polymers thereof. (2) The reaction being continued at 195°–280° C. under conditions whereby ethylene glycol is removed thereby forming a prepolymer. (3) The prepolymer being cooled and ground to a powder substantially completely passing through 20 mesh, said prepolymer having an intrinsic viscosity of from 0.2 to 0.45, and (4) heating this prepolymer powder in an inert atmosphere with agitation at a temperature above 200° C. and below the conglomerating temperature of the powder so as to produce high polyester having an intrinsic viscosity at least 5% greater than the intrinsic viscosity which would have been obtained under the same conditions using none of said scrap in the preparation of said monomeric composition. It is apparent that this process provides an effective way for recovering high polyester scrap polyethylene terephthalate without having to accomplish the conversion of said scrap into dimethyl terephthalate. Moreover, there is also provided an alternative process whereby newly formed polyethylene terephthalate of a particular intrinsic viscosity can be produced in a shorter period of time than would have been otherwise required without using high polyester scrap in the process.

Throughout this specification all intrinsic viscosities are measured in a solvent composed of 60% phenol and 40% tetrachlorethane.

The improved processes provided by this invention can be practiced using any of the catalysts known to be effective in the preparation of highly polymeric linear polyesters. Many such catalysts are mentioned in the prior art and are often referred to as ester-interchange catalysts. A few examples of such catalysts include zinc acetate, sodium hydrogen titanium hexabutoxide, titanium tetrabutoxide, titanium tetra-isopropoxide, lithium hydrogen titanium hexabutoxide, zinc borate, titanium tetrafluoride, calcium oxide, magnesium oxide, lead oxide, antimony trioxide, titanium dioxide, sodium methoxide, calcium ethoxide, potassium hydroxide, etc. Other catalysts which can be employed include combinations of compounds such as a mixture of zinc borate with antimony trioxide, a mixture of zinc acetate with an oxide of arsenic or some other compound of arsenic, rare earth fluorides, zinc and other fluorotitanates, etc. Although it appears that practically any polyesterification catalyst can be employed in accordance with this invention, especially advantageous results are obtained when a titanium or antimony compound represents at least a substantial proportion of the catalyst and it is employed along with a zinc or manganese catalyst.

The scrap polyethylene terephthalate which can be used in the process of this invention should be substantially clean in that any surface treating substances, coatings, dirt, or other foreign substances associated therewith ought to be substantially completely removed prior to use in this process. Thus, photographic film base which has been made from polyethylene terephthalate and which is being used as scrap must generally have silver halide emulsions and various other gelatin coatings and extraneous layers and substances removed prior to reuse. This is particularly true of any layers or coatings which contain cellulose esters. The same applies to fibers, yarn, fabric and the like. For these reasons, the most readily useful scrap polyester is that which has never been treated with any foreign substances. However, polyester which has been treated can usually be adequately cleaned and is just as useful as that never previously treated. As an example of how clean scrap can be obtained, film coated with silver halide emulsions and other photographic elements is chopped into small pieces, and then the gelatin-containing silver is dissolved by stirring in dilute caustic soda solution at 180° C. for 3 hours with or without a wetting agent (water soluble antihalation backings are also removed in this step); the scrap can then be rinsed with water and if desired it can be bleached by means of a dilute sodium sulfite bath, after which it is preferably thoroughly dried at about 100° C. Of course other chemicals and variations in methods can be similarly used to obtain clean scrap film, yarn, etc. Dyed yarn may require quite extensive cleaning operations but can be used in some cases even if some color remains. For most practical purposes it is necessary to remove all foreign substances so that not more than about 0.001% by weight thereof is left in or on the scrap.

Polyethylene terephthalate scrap being used in the processes of this invention should be of a size and shape which will permit it to dissolve in ethylene glycol or a mixture of ethylene glycol and dimethyl terephthalate prior to the completion of the ester-interchange reaction between the dimethyl terephthalate and the ethylene glycol. Film of normal gauges suitable for photographic film base or as a wrapping material meets this requirement. The same applies to fibers and yarn produced therefrom including staple yarn. Molded pieces should be broken to some extent if they were of considerable size originally. It is preferred that the pieces of scrap used in the process of this invention have at least one dimension less than 0.2". The larger the pieces are, the longer it will take to secure dissolution during the ester-interchange reaction. Moreover, it is obvious that the scrap introduced should not be in a form which will interfere with the agitation of the material during the ester-interchange reaction. This reaction forming a monomeric composition can be carried out in batch processes or by continuous means and it is apparent that any continuous process should be carried out using scrap having relatively small dimensions in all directions such as small chips, pellets, chopped fibers, flakes, chopped film, etc.

This invention can be further illustrated by the following examples of preferred embodiments, although it will be understood that these examples are included merely for purpose of illustration and are not intended to limit the scope of the invention unless otherwise specifically indicated.

*Example I*

Extruded polyethylene terephthalate scrap film with an intrinsic viscosity of 0.64 in 60:40 phenol tetrachlorethane solution was cut into pieces 1½″ x 4″. Sixty pounds (about 1 mole proportion) of this scrap film, 60 pounds (about 1.1 mole proportions) of dimethyl terephthalate, 80 pounds (about 4.5 mole proportions) of ethylene glycol, and a catalyst solution containing sodium and titanium alcoholates were agitated and heated in a large reaction vessel equipped with a packed column at increasing temperatures above 150° C. A monomeric composition was formed during the ester interchange reaction (temperatures up to 200°) which proceeded smoothly, during which time the glycol was returned to the vessel while methanol was being removed. No difficulty was encountered with the reused scrap and during the ester interchange period the scrap dissolved completely. During heating at above 200° the glycol and residual methanol were removed and the pressure was decreased gradually to 100 microns. The final temperature was 270° and was reached after a total period of six hours. Then the prepolymer was extruded, cooled, and ground to an average mesh size of 60–80. The intrinsic viscosity of the particles of prepolymer was 0.38. This prepolymer was then heated in a reaction vessel with agitation under a vacuum (210°–220° C. at less than 500 microns of Hg pressure) until the intrinsic viscosity of the product was 0.87; it had generally excellent physical and chemical properties including clarity and lack of discoloration. Substantially similar results can be obtained using scrap film having a subbing layer of a polymer of vinylidene chloride, itaconic acid and methyl methacrylate, provided the subbing is first washed off in aqueous alkali (pH 8–10) as described above.

Examples II, III and IV were performed according to the procedure of Example I using 120 pounds of the combination of scrap film with dimethyl terephthalate (if any) and 80 pounds of ethylene glycol.

*Example II*

According to the procedure of Example I, polyethylene terephthalate was made without the use of high polyester scrap by reacting 120 pounds dimethyl terephthalate with 80 pounds of ethylene glycol. The catalyst was the same as in Example I and the same apparatus was employed. The intrinsic viscosity of the prepolymer powder was 0.38. After a powder buildup reaction of 4.75 hours at 218° C., the powder had only reached an intrinsic viscosity of 0.81 as compared to 0.87 achieved in Example I.

*Exampe III*

According to the procedure of Example 1, 30 pounds (1 mole) of high polyester scrap film, 90 pounds (about 3.2 moles) of dimethyl terephthalate, 80 pounds (about 9 moles) of ethylene glycol, and a catalyst solution containing sodium and titanium alcholates were reacted. The intrinsic viscosity of the prepolymer powder was 0.39; the intrinsic viscosity of the product after a powder buildup reaction of 4 hours at 218° C. was 0.91.

*Example IV*

According to the procedure of Example I, 12 pounds (1 mole) of scrap film, 108 pounds (about 9.7 moles) of dimethyl terephthalate, 80 pounds (about 22.4 moles) of ethylene glycol, and a catalyst solution containing sodium and titanium alcoholates were reacted. The intrinsic viscosity of the prepolymer powder was 0.38; the intrinsic viscosity of the product from the powder buildup reaction of 4 hours at 218° C. was 0.87. The powder had an average particle size of about 0.2 mm.

A summarization of pertinent data can be presented to more graphically portray the advantages of the preceding embodiments of the invention as follows (percent is based upon combined weight of reused scrap polyester and dimethyl terephthalate):

TABLE I

| Percent Scrap used in preparing the prepolymer | Intrinsic viscosity and deviation from standard for prepolymer powders after powder buildup at 218° C. | | | |
|---|---|---|---|---|
| | I.V. at start | I.V. after 1 hr. | I.V. after 3 hrs. | I.V. after 10 hrs. |
| None (std.) | 0.38 | 0.57 (std.) | 0.72 (std.) | 0.85 (std.) |
| 10 (Example IV) | 0.38 | 0.66 (+0.09) | 0.79 (+0.07) | 0.93 (+0.08) |
| 25 (Example III) | 0.39 | 0.78 (+0.21) | 1.06 (+0.34) | 1.20 (+0.35) |
| 50 (Example I) | 0.36 | 0.66 (+0.09) | 0.94 (+0.22) | 1.10 (+0.25) |

As can be seen, using 25% scrap produces the most marked improvement. Small deviations among the starting intrinsic viscosities (0.02 at the most) are not considered to have any significant effect upon the I.V. after powder buildup. Of course, the results using 50% also produce a marked improvement and it is apparent that using more than 50% scrap would produce equivalent results.

Similar results can be obtained using pieces of molded objects, fibers, yarn, and other scraps of polyethylene terephthalate which have been cleaned so as to remove any foreign substances adhering thereto. The catalysts used in the above examples advantageously include titanium compounds which include sodium hydrogen titanium hexabutoxide as well as other related compounds such as titanium tetrabutoxide, lithium hydrogen titanium tetrabutoxide, zinc fluorotitanate, titanium tetrafluoride, a mixture of zinc acetate with titanium tetrabutoxide, magnesium titanium hexaisopropoxide, and other alkali metal and alkaline earth metal bimetallic complexes of organotitanium compounds, mixtures of such compounds with other polyesterification catalysts known in the art, etc. Less advantageously this invention can be conducted using other catalysts known to be useful as polyesterification catalysts wherein the catalytic composition does not necessarily include titanium. Such catalysts include sodium methoxide, lithium aluminum hydride, magnesium iodide, magnesium metal which has been treated with vapors of iodine, zinc borate, cadmium acetate, salts of rare earth metals, organo-metallic compounds containing rare earth metals such as lanthanum, cerium, gadolinium, erbium, lutecium, terbium, illinium, etc. The proportion of catalyst used is generally from about 0.01 to about 0.5% based on the weight of all initial reactants; however, larger or smaller proportions can be used.

As made evident hereinabove, the powder buildup step used in practicing this invention can be conducted under a vacuum or in the presence of an inert atmosphere such as nitrogen, carbon dioxide, helium or the like at atmospheric pressure under conditions whereby the inert atmosphere is circulated so as to remove volatile byproducts. The powder used in the powder buildup step should preferably be substantially free of moisture. If water is present, it can be removed by heating the prepolymer particles at 100° C. or higher in the reaction vessel about to be used for the powder buildup polymerization reaction. Of course, other means of drying can be used.

The preceding detailed description relates to the problem of advantageously using highly polymeric scrap polyester. Such reused polyester is that which has been obtained from the ultimate polymerization as contrasted to reused prepolymer which has not been polymerized to an extent sufficient to have its most advantageous properties. The approximate ranges of molecular weight in prepolymer and high polyester have been given hereinabove.

In the course of manufacturing high polyesters it occasionally happens that the prepolymer is not adequately susceptible to solid phase polymerization so as to enable production of high polyester of the desired intrinsic viscosity within that sufficiently short period of time required to avoid the side reactions and degradation problems which can accompany the polymerization process. Such prepolymer is referred to as inactive prepolymer and it can be reused in a manner analogous to that described above where reused high polyester scrap is employed during the preparation of new monomeric compositions.

In addition, it has been found that it is possible to activate inactive prepolymers by merely heating them with from about 5% to about 15% by weight of the diol originally used in the preparation of such reused scrap prepolymer. This accomplishes the degradation of the reused prepolymer during the course of its being dissolved in the diol and converted into a new highly active monomeric composition. This process is different from the usual process of preparing a monomeric composition since there is no ester-interchange reaction in the usual sense. Instead, the long chains of reused prepolymer molecules are split and the diol is added to the points of cleavage so as to form highly active monomeric esters including low polymers thereof appearing to probably have a degree of polymerization less than about 10 on the average. By using no more than about 15 to 20% of the diol to react with the reused inactive prepolymer scrap, the resultant monomeric composition actually consists of a substantial proportion of low polymers having a degree of polymerization probably less than about 10 on the average. For some unknown reason this appears to contribute to a higher degree of activity when such a monomeric composition is then converted into a prepolymer by the elimination of the excess glycol.

The following example is analogous to Example II given above in that it illustrates a procedure for making polyethylene terephthalate prepolymer not using the method of this invention.

*Example V*

Using the procedures described hereinabove in a similar apparatus a mixture of 38.8 g. (0.2 mole) of dimethyl terephthalate, 24.8 g. (0.4 mole) of ethylene glycol, and 0.25 ml. of 14% $Ti(OC_4H_9)_4$ in butanol was heated with stirring under an inert atmosphere in a reaction vessel equipped with a packed column at 180–220° C. for 2 hours during which time the ester-interchange reaction reached substantial completion. The monomeric composition was then heated until a temperature of 270° C. was reached and a vacuum of from 1 to 3 mm. was applied and held for 10 minutes. The resulting prepolymer was then ground to a powder and further polymerization in the solid phase was performed in accordance with the powder buildup technique described hereinabove. A series of batches of such prepolymer were prepared having an intrinsic viscosity of about 0.25 on the average. Then the prepolymer was polymerized in the solid phase at 240° C. for 3 hours at 0.08 mm. Various batches of prepolymer powder were converted into polyester having an average intrinsic viscosity of 0.92. However, occasional batches were found to polymerize to intrinsic viscosities of considerably lower values. For example, one batch was found to polymerize to an intrinsic viscosity of 0.82. The intrinsic viscosity measurements were made for the various batches of prepolymer employing only a small portion of the original amount of prepolymer and served as a determination as to whether the prepolymer was of the desired degree of activity. That batch which was found to polymerize to an intrinsic viscosity of only 0.82 is illustrative of an inactive prepolymer scrap and was reused and thereby activated employing the following procedure.

*Example VI*

Six g. (1 mole proportion) of the prepolymer from Example V having an intrinsic viscosity of 0.82 was mixed with 1 g. (about 0.56 mole proportion) of ethylene glycol and 0.05 ml. of a 14.4% solution of $NaTiH(OC_4H_9)_6$ dissolved in butanol and was melted rapidly by immersion in a metal bath at 295° C. under an inert atmosphere with agitation. By the time the melt reached 285° C. the prepolymer had liquified and dissolved in the glycol and excess glycol had become evaporated. A vacuum was applied and held at 1 to 3 mm. for 5 minutes to remove residual glycol and the prepolymer was then poured into cold water. It was dried, pulverized and further polymerized in the solid phase and was found to build to an intrinsic viscosity of 1.20 using the powder buildup technique under vacuum at 240° C. for 3 hours (see Example V above). Thus, it is apparent that an originally inactive reused prepolymer having an intrinsic viscosity of about 0.25 was activated by this procedure so as to be capable of producing a polyester which could be polymerized to an intrinsic viscosity even greater than that of the average of those prepolymers which were originally considered active and which were prepared in the same manner as the originally inactive propolymer.

The following additional two examples will illustrate this aspect of the invention in regard to a copolyester of 4,4'-sulfonyldibenzoic acid and terephthalic acid condensed with neopentyl glycol, namely, 2,2-dimethyl-1,3-propanediol. Example VII describes the preparation of the prepolymer by a procedure not embodying this invention.

*Example VII*

A mixture of 62.7 g. (0.15 mole) of dibutyl 4,4'-sulfonyldibenzoate, 5.8 g. (0.03 mole) of dimethyl terephthalate, 28.0 g. (0.27 mole) of 2,2-dimethylpropanediol and 0.5 ml. of 14.4% $NaTiH(OBu)_6$ in butanol was heated with stirring in a reaction flask under nitrogen. After 3.5 hr. at 200–220° C., the ester intercharge was complete and the temperature of the monomeric composition was raised during 45 minutes to 285° C. A vacuum of 1 to 3 mm. was applied and maintained for 5 minutes, and the prepolymer poured into cold water. The prepolymer obtained had an inherent viscosity of 0.15 and small portions of it built to an I.V. of only 0.68 after solid phase polymerization at 270° C. at 0.08 mm. for 3 hours. However, other prepolymers made by identical procedures built to inherent viscosities of from 0.59 to as high as 1.10.

Several of the prepolymers prepared in accordance with this example were considered relatively inactive since it was desired to produce high quality polyesters having an intrinsic viscosity of close to 1.0 or more. The prepolymers which were considered relatively inactive were reused and activated to form prepolymers of high activity by the following procedure.

*Example VIII*

Sixty grams (1 mole) of the prepolymer prepared from 2,2-dimethylpropanediol, and containing the residues of 4,4'-sulfonyldibenzoic acid and terephthalic acid in the ratio of 5:1 (this is the prepolymer of Example VII having an I.V. of 0.15, of which a small portion was built to a high polyester having an I.V. of 0.68), was mixed with 10 g. (about 0.57 mole proportions) of 2,2-dimethylpropanediol and 0.5 ml. of 14.4% $NaTiH(OBu)_6$ in butanol (this catalyst is shown in U.S. 2,720,502) and melted rapidly by immersion in a metal bath at 295° C. under an inert atmosphere with agitation. When the melt reached 285° C., a vacuum was applied and held at 1 to 3 mm. for 5 minutes. The activated reused scrap prepolymer was then poured into cold water, pulverized and dried. It was polymerized and built in the solid phase at 270° C. After 3 hours at 270° C. under 0.08 mm. of pressure, the intrinsic viscosity was 1.70. Thus, it can be seen that a relatively inactive prepolymer which would only produce a high polyester having intrinsic viscosity of 0.68 under given conditions can be reactivated and reused by the practice of this invention so that the activated prepolymer produces an intrinsic viscosity of 1.70.

Although additional catalyst can advantageously be used in activating the inactive prepolymers as described in Examples V through VIII, the same inactive prepolymers can be activated without added catalyst. Thus, the activated prepolymer resulting from the process described in Example VIII, but under conditions where no catalyst was used, was capable of being polymerized in the solid phase to an intrinsic viscosity of 0.96 using the same procedure as described in Example VIII without any catalyst. Although this I.V. is lower than the intrinsic viscosity obtained by the catalyzed procedure described in Example VIII, nevertheless this intrinsic viscosity is approximately that which was desired and is considerably higher than that which would have been obtained using the originally inactive prepolymer and a catalyst as described in Example VII (I.V. of 0.68).

In order to illustrate the effect of the amount of catalyst in preparing prepolymers, a prepolymer prepared as described in Example VII was made by two identical procedures except on one case 0.5 ml. of the catalyst was used and in the second case 1.0 ml. of the catalyst was used. The ultimate high polyester produced in the first case had an intrinsic viscosity of 0.99 after 3 hours of polymerization at 270° in the solid phase and the ultimate high polyester using twice the amount of catalyst resulted under the same conditions in achieving an intrinsic viscosity of 1.00. It therefore appears that using larger amounts of catalyst is not a critical factor which contributes to the activation of prepolymers in accordance with the preceding examples. However, the addition of the extra catalyst is advantageous as is obvious from the improved results obtained by the use thereof during the activation.

The following example describes a procedure (which does not embody this invention) for preparing a polyester of 4,4'-sulfonyldibenzoic acid modified with 16.6 mole percent succinic acid condensed with 1,5-pentanediol.

*Example IX*

A mixture of 100 gram moles of dibutyl sulfonyldibenzoate, 20 gram moles of succinic anhydride, 180 gram moles of 1,5-pentanediol, 0.25 lb. of finely dispersed $TiO_2$ and 150 ml. of a 2% solution of sodium and titanium in butanol was heated at 235° C. with stirring in a stainless steel vessel. After 3.5 hours the ester-interchange reaction was complete and the monomeric composition was transferred into another stirred vessel at 260° C. The reaction vessel temperature was then increased to 285° C. and when the temperature of the reaction mixture had reached 260° C., most of the excess 1,5-pentanediol had been removed and the system pressure was reduced at the rate of 1 inch of mercury per minute until a vacuum of 30 inches of mercury had been achieved. The resulting prepolymer was extruded into cold water, pulverized, dried and found to have an intrinsic viscosity of 0.2. A series of 50 runs using this same procedure gave similar results with the average intrinsic viscosity of the prepolymer being 0.2. Portions of the various batches of prepolymer were polymerized at 203° C. for 2 hours under a vacuum to produce polyesters having an average intrinsic viscosity of 1.48.

Some of the prepolymer produced in accordance with Example IX did not polymerize to form a polyester of an intrinsic viscosity approaching the average of 1.48 normally obtained. The batches of inactive prepolymer scrap could be reused and activated by treatment with from 5 to 20% of 1,5-pentanediol with or without additional catalyst as described in Examples VI and VIII or they could be activated and reused in a manner analogous to that described in Examples I, III, IV and V. In a manner somewhat analogous to that set forth in Example III, 20% of inactive prepolymer based on the total weight of the starting mixture, was used in preparing the monomeric composition according to the first phase of the process described in Example IX, the ratios of reactants set forth in Example IX being unaffected. In other words, the procedure used here constitutes the addition of inactive prepolymer to the starting materials using the normal proportion of reactants. According to this procedure the prepolymer dissolves in the reaction mixture during the ester-interchange portion of the reaction to form a monomeric composition having a relatively low degree of polymerization. An example is as follows:

*Example X*

The procedure described in Example IX was conducted in the presence of 20% by weight of inactive prepolymer whereby a new active prepolymer was obtained of higher activity than would have been obtained if the inactive prepolymer had not been added to the starting materials. The active prepolymer which was obtained was polymerized by the method described in Example IX to give high polyesters having upgraded intrinsic viscosities including values at least 5% greater than obtained using the method set forth in Example IX.

The recovery of inactive prepolymer is best accomplished by the method using an additional 5% to 20% or more by weight of the diol used in preparing the polyester based on combined weight of reused prepolymer and glycol, whereas the recovery of high polyester scrap is best accomplished by addition to a mixture of the diol and diester of the dicarboxylic acid used in preparing more of the same polyester in a subsequent batch. It is therefore apparent that these two aspects of this invention are not equivalents and are patentably distinct inventions within the generic concept set forth hereinabove. However, since the proportions which can be used overlap, both aspects are described and claimed herein.

The practice of this invention by merely adding high polyester re-used scrap to a subsequent batch without disturbing the normal ratio of reactants can be used for recovering scrap film, yarn or other forms of polyester as illustrated by the following example.

*Example XI*

The procedure described in Example VII was repeated adding 20% (based on the weight of the starting materials) of scoured yarn derived from a polyester produced from a previous batch. The added scoured yarn had an intrinsic viscosity of about 0.8. During the ester-interchange reaction the re-used scoured yarn scrap melted and dissolved into the reaction mixture. The prepolymer which was produced was polymerized in the solid phase using the process set forth in Example IX to produce a polyester having an intrinsic viscosity of 2.02. A series of 18 similar runs was conducted using scrap film, yarn, chips of molded polyester and the like giving high polyesters whose intrinsic viscosity average was 1.71. The increased activity obtained in accordance with this Example XI is a most unexpected improvement since the average intrinsic viscosity obtained without the use of scrap as described in Example VII was only 1.48.

Although several examples have been given as to the various techniques which can be used in re-using and recovering inactive prepolymer and scrap high molecular weight polyester in accordance with this invention, it is apparent that other variations can also be employed with regard to the same or different polyester esters than those illustrated hereinabove.

Example XII

Sixty grams of a prepolymer were prepared from the condensation of 4.4'-sulfonyldibenzoic acid and isophthalic acid in the ratio of 5 moles to 1 mole condensed in the form of the butyl esters of the acids with 2,2-dimethylpropanediol according to the method described in Example IX. Various batches of the prepolymer obtained from a series of such condensations had satisfactory intrinsic viscosities for the purpose intended. However, some of the prepolymer batches obtained had poor activity and did not produce polyesters having an intrinsic viscosity much above 0.7. Sixty grams of one such batch of prepolymer which was only capable of being built to an intrinsic viscosity of 0.68 was mixed with 10 g. of 2,2-dimethylpropanediol and 0.5 cc. of 2% $NaTiH(OC_4H_9)_6$ and this mixture was melted with agitation and under an inert atmosphere in a reaction vessel immersed in a metal bath at 295° C. When the melt had reached a temperature of 287° C. a vacuum was applied and held at about 1 to 3 mm. from 3 to 5 minutes. The prepolymer was then poured into water, and pulverized. The powder was built up in the solid phase at 270° C. for 3 hours at 0.08 mm. of mercury pressure. The polyester obtained had an intrinsic viscosity of 1.70. This intrinsic viscosity was unexpectedly high in view of the fact that average prepolymer batches which are normally considered to be active usually produce high polyesters having intrinsic viscosities of from about 0.9 to about 1.1 under the conditions used. Other runs using the same process for activating inactive reused prepolymers resulted in intrinsic viscosities well above 1.1 in each instance.

The contrast between the results obtained in accordance with the present invention and the corresponding results obtainable using the melt phase technique for preparing polyesters can be illustrated by the following procedure which was used for the recovery of high polyester scrap derived from 4,4'-sulfonyldibenzoic acid condensed with 1,5-pentanediol. The polyester scraps used had an intrinsic viscosity of close to 0.6 although the scraps being recovered in this specific instance included some polyester having an intrinsic viscosity somewhat below 0.6. About 3.8 lbs. of the reused polyester scrap was mixed with 2.58 lbs. of 1,5-pentanediol and 5 ml. of a 2% solution in butanol of sodium and titanium. This mixture was heated at 215–225° C. with agitation for 1.25 hours under a nitrogen atmosphere. The reaction vessel was heated in a bath which was then increased to 280° C. over a period of 1 hour. During this time about 750–1000 ml. of 1,5-pentanediol was boiled off. At this point the pressure of the system was reduced at the rate of 1 inch of mercury per minute until a vacuum of 30 inches of mercury was obtained. The system was kept under reduced pressure for a period of 20 minutes and a pressure of 50 microns of mercury was achieved. When the load on the stirrer indicated that a maximum melt viscosity had been reached, the system was raised to atmospheric pressure with nitrogen and the polyester extruded. The high polyester obtained by this melt polymerization technique had an intrinsic viscosity range among various batches on the order of about 0.6, or somewhat higher, thereby producing polyester of satisfactory intrinsic viscosity using high polyester scrap. However, the results achieved from the use of high polyester scrap according to such a melt phase polymerization process do not provide any predictable uniform significant enhancement in the ultimate intrinsic viscosities of the high polyesters being produced.

As apparent from the above description in its entirety, this invention provides a process for preparing a built-up linear condensation polyester of a glycol having from 2 to 8 carbon atoms and an aromatic dicarboxylic acid, said built-up polyester having a molecular weight of at least 14,000 comprising (I) Mixing the following constituents under an inert atmosphere at an elevated temperature (a) one mole proportion of scrap linear condensation polyester of said glycol and said aromatic dicarboxylic acid having a molecular weight in the range of from about 2,500 to about 150,000, said moles being calculated on the basis of the molecular weight of each repeating unit in said scrap polyester, said scrap polyester being substantially free of surface coatings and when a solid, being in the form of small pieces having at least one dimension less than about 0.2 inch, (b) from zero to about 10 mole proportions of a dialkyl ester of said aromatic dicarboxylic acid, said alkyl radicals containing from about 1 to 6 carbon atoms, (c) an amount between about 0.05 and about 25 mole proportions of said glycol, said amount being at least as great as the amount of said dialkyl ester, said elevated temperature being in the range of from 25° C. less than, up to 50° C. more than the boiling point of said glycol, whereby all of said scrap polyester is dissolved and substantially all of the alkanol from said dialkyl ester is removed, thereby resulting in a composition composed of bis(glycol) esters of said aromatic dicarboxylic acid and low polymers thereof having a degree of polymerization of less than about 10 on the average.

(II) Heating said resulting composition and substantially completely removing that portion of said glycol vaporized by said heating, thereby forming a prepolymer having a molecular weight of from about 2,500 to about 12,000, said heating being performed under an inert atmosphere with at least the latter part of said heating being performed under a substantial vacuum.

(III) Forming said prepolymer into solid particles of a size substantially passing through a 20-mesh screen.

(IV) Heating said particles of prepolymer with agitation in an inert atmosphere, whereby said particles remain substantially free-flowing, at a temperature of from about 10° C. below, to about 90° C. below the crystalline melting point of said prepolymer, until said built-up polyester is obtained.

As explained hereinabove this invention covers two types of processes for the reuse of scrap polyester. When using a Type 1 process for recovering relatively useless prepolymer scrap, it is not necessary to have present any of the dialkyl esters as defined above, i.e. the mole proportion as defined above for (a) is one, (b) can be zero and (c) is advantageously between about 0.05 and 2 mole proportions which in certain more specific cases can be limited to measurements on a weight basis whereby the glycol (c) is from 5% to 20% by weight based upon the combined weight of the scrap prepolymer (a) and the glycol. When using a Type 2 process for recovering high polymer scrap, it is more advantageous to include at least one mole proportion of the dialkyl ester, i.e. (a) is one mole proportion, (b) is from about 1 to about 10 and (c) is from about 1 to about 25 provided it is at least as great as (b).

Although the invention has been described in considerable detail with reference to certain preferred embodiments thereof, it will be understood that variations and modifications can be effected without departing from the spirit and scope of the invention as generally described hereinabove and as defined in the appended claims.

We claim:

1. A process for preparing a built-up linear condensation polyester of a glycol having from 2 to 8 carbon atoms and an aromatic dicarboxylic acid, said built-up polyester having a molecular weight of at least 14,000 comprising (I) mixing the following constituents under an inert atmosphere at an elevated temperature (a) one mole proportion of scrap linear condensation polyester of said glycol and said aromatic dicarboxylic acid having a molecular weight in the range of from about 2,500 to about 150,000 said moles being calculated on the basis of the molecular weight of each repeating unit in said scrap polyester, said scrap polyester being substantially free of surface coatings and when a solid, being in the form of small pieces having at least one dimension less than about 0.2 inch,
(b) from zero to about 10 mole proportions of a dialkyl ester of said aromatic dicarboxylic acid, said alkyl radicals containing from about 1 to 6 carbon atoms,
(c) an amount between about 0.05 and about 25 mole proportions of said glycol, said amount being at least as great as the amount of said dialkyl ester, said elevated temperature being in the range of from 25° C. less than, up to 50° C. more than the boiling point of said glycol, whereby all of said scrap polyester is dissolved and substantially all of the alkanol from said dialkyl ester is removed, thereby resulting in a composition composed of bis(glycol) esters of said aromatic dicarboxylic acid and low polymers thereof having a degree of polymerization of less than about 10 on the average, (II) heating said resulting composition and substantially completely removing that portion of said glycol vaporized by said heating, thereby forming a prepolymer having a molecular weight of from about 2,500 to about 12,000, said heating being performed under an inert atmosphere with at least the latter part of said heating being performed under a substantial vacuum, (III) forming said prepolymer into solid particles of a size substantially passing through a 20-mesh screen, and (IV) heating said particles of prepolymer with agitation in an inert atmosphere, whereby said particles remain substantially free-flowing, at a temperature of from about 10° C. below, to about 90° C. below, the crystalline melting point of said prepolymer, until said built-up polyester is obtained.

2. A process as defined by claim 1 wherein said re-used polyester is selected from the group consisting of the following two types:
(Type 1) a scrap polyester having a molecular weight of from about 2,500 to less than 12,000 characterized in that when heated, as defined above as to Step IV, the build-up rate is substantially less than for the average of such polyesters, and
(Type 2) a scrap polyester having a molecular weight of more than 12,000.

3. A process as defined by claim 2 wherein said scrap polyester is of Type 1.

4. A process as defined by claim 2 wherein said scrap polyester is of Type 2.

5. A process as defined by claim 1 wherein said scrap polyester is of terephthalic acid and ethylene glycol.

6. A process as described in claim 1 wherein the polyester is of terephthalic acid and 1,4-cyclohexanedimethanol.

7. A process as described in claim 3 wherein a titanium catalyst is present which is active in polyesterification reactions.

8. A process as described in claim 4 wherein a titanium catalyst is present which is active in polyesterification reactions.

9. A process as defined by claim 3 wherein the following mole proportions are employed: (a) is one, (b) is zero and (c) is from about 0.05 and 2.

10. A process as defined by claim 4 wherein the following mole proportions are employed: (a) is one, (b) is from about 1 to about 10 and (c) is from about 1 to about 25.

References Cited
UNITED STATES PATENTS

| | | | |
|---|---|---|---|
| 2,933,476 | 4/1960 | Fisher | 260—75 |
| 2,727,882 | 12/1955 | Vodonik | 260—75 |
| 2,901,466 | 8/1959 | Kibler et al. | 260—75 |
| 3,075,952 | 1/1963 | Coover et al. | 260—75 |

MURRAY TILLMAN, *Primary Examiner.*

SAMUEL H. BLECH, *Examiner.*

D. J. BREZNER, *Assistant Examiner.*